(12) United States Patent
Huibers et al.

(10) Patent No.: US 8,116,005 B2
(45) Date of Patent: Feb. 14, 2012

(54) LIGHT COMBINER

(75) Inventors: Andrew Gerritt Huibers, Sunnyvale, CA (US); Regis Grasser, Mountain View, CA (US)

(73) Assignee: Texas Instruments Incorporated, Dallas, TX (US)

( * ) Notice: Subject to any disclaimer, the term of this patent is extended or adjusted under 35 U.S.C. 154(b) by 67 days.

(21) Appl. No.: 12/062,779

(22) Filed: Apr. 4, 2008

(65) Prior Publication Data

US 2009/0251783 A1 Oct. 8, 2009

(51) Int. Cl.
*G02B 27/10* (2006.01)
*G02B 27/28* (2006.01)
(52) U.S. Cl. .................. 359/618; 359/490; 359/634
(58) Field of Classification Search .............. 359/490, 359/618, 634
See application file for complete search history.

(56) References Cited

U.S. PATENT DOCUMENTS

| | | | | |
|---|---|---|---|---|
| 5,623,349 A * | 4/1997 | Clarke | ............................... | 349/8 |
| 5,726,719 A * | 3/1998 | Tanaka et al. | ..................... | 349/8 |
| 6,049,364 A * | 4/2000 | Takahara et al. | ................ | 349/10 |
| 6,070,982 A * | 6/2000 | Aritake | ............................ | 353/20 |
| 6,501,517 B1 * | 12/2002 | Choi | ............................ | 348/778 |
| 6,665,122 B1 * | 12/2003 | Yamagishi | ..................... | 359/634 |
| 2004/0012831 A1 * | 1/2004 | Kim et al. | ........................ | 359/15 |
| 2004/0057018 A1 * | 3/2004 | Cho et al. | ........................ | 353/31 |
| 2005/0219847 A1 * | 10/2005 | Ikeda et al. | .................... | 362/268 |
| 2005/0270775 A1 * | 12/2005 | Harbers et al. | ................. | 362/231 |

* cited by examiner

*Primary Examiner* — James Greece
(74) *Attorney, Agent, or Firm* — Warren L. Franz; Wade J. Brady, III; Frederick J. Telecky, Jr.

(57) ABSTRACT

For combining light from different light sources in a light source, dichroic filters are displaced individually according to the physical arrangement of the light sources such that the reflected light from the dichroic filters is coincident in angle and space.

6 Claims, 15 Drawing Sheets

LIGHT COMBINER

TECHNICAL FIELD OF THE DISCLOSURE

The technical field of this disclosure relates to the art of optical devices; and more particularly to the art of optical systems for directing illumination light to light valves in imaging systems.

BACKGROUND OF THE DISCLOSURE

In recent years, solid-state light sources and other narrow-wavelength-band and/or polarized light sources capable of producing visible light have drawn significant attention as alternative light sources to traditional light sources for use in imaging systems (such as projection systems) due to many advantages, such as compact size, greater durability, longer operating life, and lower power consumption. For example, solid state sources such as LASERs, light-emitting-diodes (LEDs), and pumped non-linear optical crystals are increasingly used in imaging systems, especially imaging systems that employ one or more light valves each of which comprises an array of individually addressable pixels.

Despite their recognized superior properties over traditional light sources, solid-state light sources can be difficult to optically couple with light valves in imaging systems for illuminating light valves. For example, it is difficult to generate a far-field illumination area with uniform illumination intensity at a light valve location using solid-state or narrow-band light sources. This arises from a fact that the illumination light from the solid-state sources can be distributed over a large solid angle, up to a full hemisphere.

In color imaging applications using solid-state sources (or other narrow-band sources), light sources comprising one or more solid state sources emitting light of different colors or spectral profiles are provided to illuminate light valves. It is desired that the light of different colors illuminates a light valve along substantially the same optical path, for instance, with substantially the same incident angle to the pixels of the light valve. It is desirable that the multiple beams, such as colored beams, overlap to occupy the same angular and spatial optical phase space.

Because a single light source may have limited output power, which may not be sufficient to generate images with satisfactory brightness, multiple light sources for the same color light (with the same wavelength or different wavelengths, and with the same or different electromagnetic polarization state) can be employed in an imaging system. Regardless of different spatial arrangements, the light beams from separate light sources are spatially separated when exiting from the light sources. Without proper management, the spatially separated light beams may result in distorted illumination field, as well as other unwanted optical effects at the light valve, such as poor image uniformity and reduced system brightness.

Therefore, what is desired is an optical system that is capable of directing light from light sources to one or more light valves in imaging systems.

SUMMARY

In view of the foregoing, disclosed herein is an optical system that comprises at least one optical filter, such as a dichroic filter (e.g. a thin film interference filter), and a reflective surface. In imaging systems employing one or more light valves, additional optical elements can be used for directing light from light sources to the light valves.

In one example, an optical system is provided herein, comprising: a light source comprising first and second light sources; and first and second dichroic filters that are substantially-flat and non-parallel for directing light from the light source arrays.

In another example, a method is disclosed herein, comprising: providing light from first and second light sources; reflecting the light from the first light source by a dichroic filter that passes the light from the second light source; and reflecting the light from the second light source by a reflective surface, wherein the reflective surface has an angle to the dichroic filter with the angle being determined based upon an arrangement of the first and second light sources.

In yet another example, a method is disclosed herein, comprising: providing light from first and second light sources each comprising a principal optical axis, wherein the principal optical axes of the first and second light sources are not coincident; reflecting the light from the first light source towards a desired optical direction by a dichroic filter that passes the light from the second light source; and reflecting the light from the second light source by a reflective surface such that the reflected light from said reflective surface is substantially along the same optical path as the light reflected from said dichroic filter.

In yet another example, an optical system is disclosed herein, comprising: a light source comprising first, second, and third light sources that are arranged in a two-dimensional array; and a filter group comprising first and second dichroic filters and a reflective surface for directing the light from the first, second, and third light source towards a light valve.

In yet another example, an imaging system is disclosed herein. The system comprises: an optical system that comprises: a light source comprising first and second light sources; and first and second optical filters that are non-parallel for directing light from the light sources; and a light valve for modulating the light from the optical system, wherein the light valve comprises an array of individually addressable pixels, and wherein the optical filter could be a dichroic filter, a wire grid polarizer, or a mirror.

In yet another example, an imaging system is disclosed herein. The system comprises: an optical system that comprises a light source comprising first, second, and third light sources that are arranged in a two-dimensional array; and a filter group comprising first and second dichroic filters and a reflective surface for directing the light from the first, second, and third light source towards a light valve; and a light valve for modulating the light from the optical system, wherein the light valve comprises an array of individually addressable pixels.

DETAILED DESCRIPTION OF SELECTED EXAMPLES

Disclosed herein is an optical system that comprises at least one optical filter and a reflective surface for directing light from a group of light sources. A reflective surface here can refer to a surface that reflects light of certain polarization or wavelength, such as a mirror, or a second optical filter such as a dichroic filter or reflective polarizer. The reflective surface and the optical filter are typically flat, but they can also be curved or have optical power. In the following, the optical system will be discussed with reference to particular examples. However, it will be appreciated by those skilled in the art that the following discussion is for demonstration purpose, and should not be interpreted as a limitation. Other variations within the scope of this disclosure are also applicable.

Figure 1:
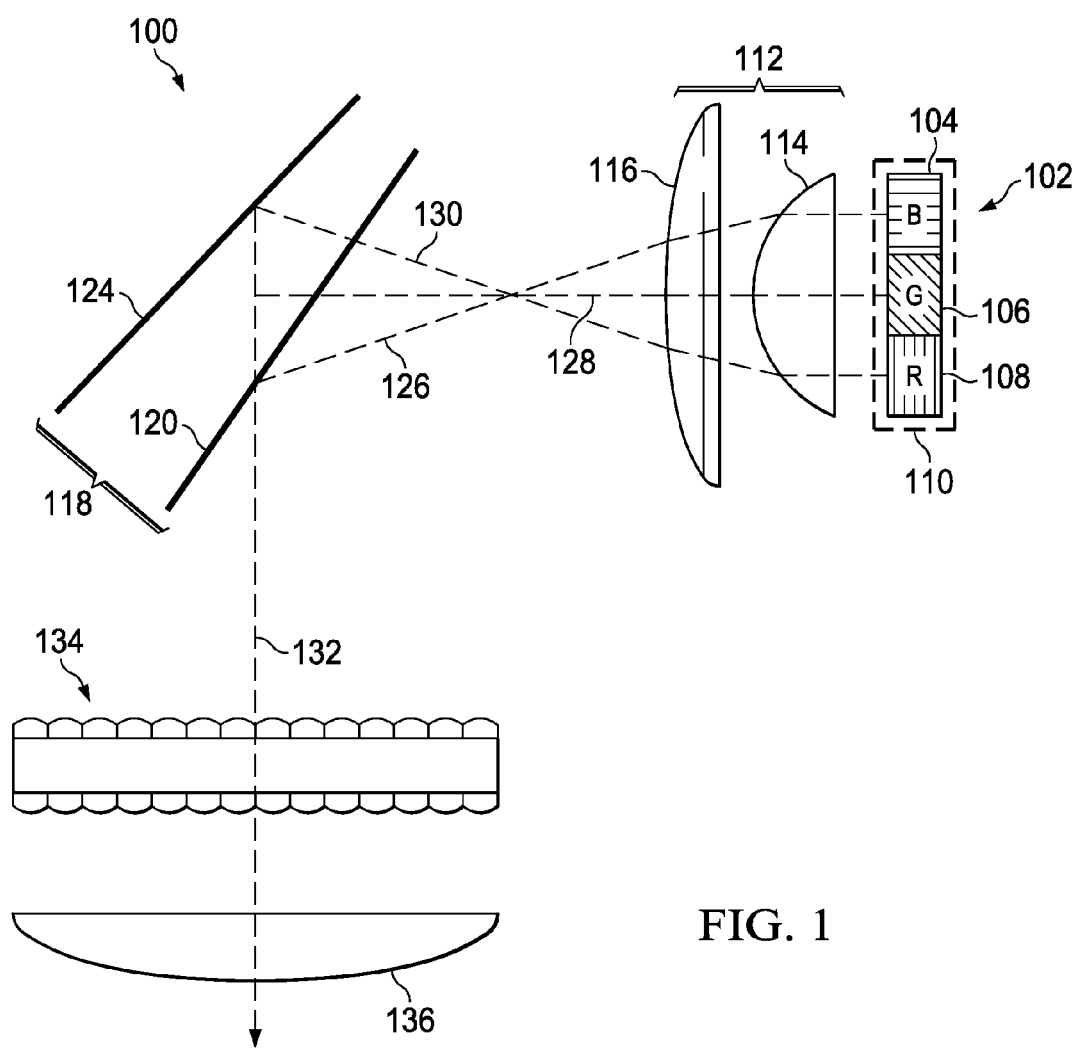
FIG. 1 is a diagram of an exemplary optical system for combining light from multiple light sources in an imaging system using a set of dichroic filters.

Referring to the drawings, FIG. 1 is a diagram showing an exemplary optical system of this disclosure. Optical system 100 in this example comprises light source 102, collimation optics 112, and optical filter group 118.

Light source 102 comprises an array of light sources for providing illumination light of desired colors. In the example as illustrated in FIG. 1, the light source array (102) comprises light sources 104, 106, and 108 for providing blue, green, and red light. By turning on and off the individual light sources at different time intervals, light of an exceedingly wide range of colors can be achieved.

The light sources can comprise solid-state devices such as lasers, LEDs, or other wavelength or polarization limited sources, or any combinations thereof. For example, the light sources can incorporate AlGaInP light emitting diodes, InGaN light emitting diodes, resonant cavity LEDs, LEDs with non-Lambertian emission profiles, LEDs producing polarized light, or other suitable LEDs. Laser light sources can be vertical cavity surface emitting lasers (VCSEL), extended cavity surface emitting lasers (NECSEL) or any other suitable lasers.

When a single light source (such as an LED die) is employed for providing light of a specific color, the light may not have sufficient intensity due to the limited output power of the light source. In this instance, multiple light sources can be arrayed for providing light of the specific color, which will be discussed in detail afterwards with reference to FIG. 3 through FIG. 5.

When the light sources (104, 106, and 108) are light sources comprising solid state devices, especially when the light sources are laser sources and/or LEDs, the light sources can be formed on the same substrate, such as substrate 110, which can be a semiconductor substrate or many other suitable substrates. The light sources can be deployed on the substrate as a one dimensional array as illustrated in FIG. 1, or can be arranged as a two-dimensional array, or any desired arrangement, as will be discussed afterwards with reference to FIG. 3 through FIG. 5.

Different applications using the optical system (100) may desire light of different colors or light of different color combinations. Accordingly, the light source array (102) may comprise any suitable combinations of solid-state light sources or combinations of any suitable light emitting devices.

In addition to solid state light sources, the light source array (102) may comprise other types of light emitting devices. For example, the light source array (102) may comprise a discharge lamp, such as a mercury lamp, a metal halide lamp, a xenon lamp, an organic or electro-luminescent light-emitting film, a phosphor, quantum dots, a non-linear optical element or other types of light emitting devices.

For combining the light from individual light sources, the light from the light sources are directed to optical filter group 118 through collimation optics 112 that comprises lenses 114 and 116 in this example. As schematically illustrated in FIG. 1, dashed line 126, dash-and-dotted line 128, and solid line 130 respectively illustrate the principal optical axes of the light from light sources 104, 106, and 108. The collimated light 126, 128, and 130 are incident to the dichroic filters in the optical filter group (118).

The dichroic filters in the group (118) can be selected based upon the number of different colors of the light emitted from the light source array (102). In one example, the number of dichroic filters of different color filtering properties in the filter group (118) can be equal to the number of different colors of the light from the light source array (101). Given that one of the dichroic filters can be replaced by a reflective surface, the total number of dichroic filters of different color filtering properties in the filter group (114) can be one less than the total number of different colors of the light from the light source array (101). For example, a dichroic filter for the blue color is expected to have a color filtering property such that the dichroic filter is capable of reflecting the blue light and transmitting or passing light of other colors. Light of a specific color is referred to as an electromagnetic wave having a wavelength or a wavelength range that is substantially within the wavelength range of the particular color. For examples, red light is referred to as light having a wavelength within the range of 620 nm to 750 nm. Green light is referred to as light having a wavelength within the range of 495 nm to 570 nm. Blue light is referred to as light having a wavelength within the range of 420 nm to 495 nm. Accordingly, dichroic filters for the red, green, and blue light respectively reflect the light in the red, green, and blue color ranges and pass light of other colors.

In examples wherein non-visible light, such as infrared light, ultraviolet light, or other non-visible light is to be employed, the dichroic filter(s) can be selected according to the specific light. For example, when near-infrared light is employed in the optical system, a dichroic filter capable of reflecting light having a wavelength in the range of 700 nm to 1400 nm can be included in the optical filter group. When near-ultraviolet light is employed in the optical system, a dichroic filter capable of reflecting light having a wavelength in the range of 300 nm to 400 nm can be included in the optical filter group.

Because the light from the light sources are propagating along different paths with different angles relative to, for example, the principal optical axis of the optical system (100), the dichroic filters can be arranged according to the physical arrangement of the light sources in the light source array such that substantially all light from the light sources are spatially and angularly coincident after being reflected by the dichroic filters. For demonstration purpose, FIG. 2*a* illustrates the angular relationships of the dichroic filters and the light from the light sources that are arranged in a one dimensional array as illustrated in FIG. 1.

Figure 2A:
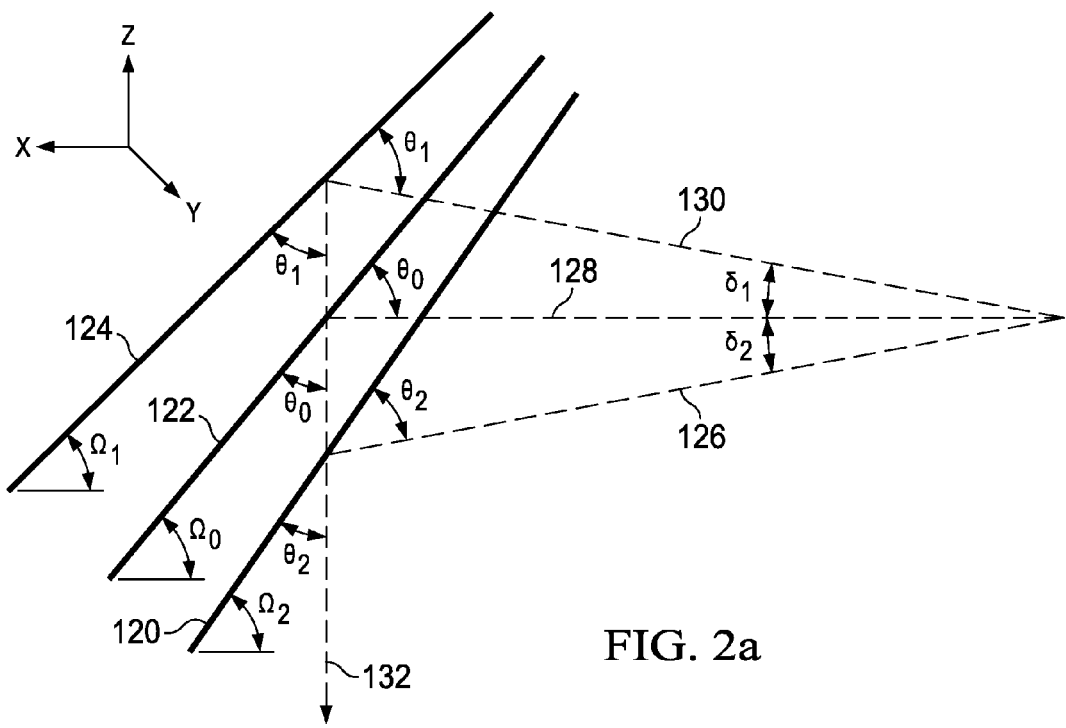
FIG. 2a is a diagram showing the angular relationships of the dichroic filters, the light incident thereto, and the light departing therefrom in the optical system of FIG. 1.

Referring to FIG. 2*a*, dashed line 126, dash-and-doted line 128, and solid line 130 are principle optical axes of the light emitted from the light sources 104, 106, and 108 (as illustrated in FIG. 1) after collimation optics 112 (as illustrated in FIG. 1). By assuming that the principal optical axis 128 of the light from light source 106 (as illustrated in FIG. 1) is parallel to the X axis of the Cartesian coordinate, principal optical axes 126 and 130 have angles $\delta_1$ and $\delta_2$ to principal axis 128 before the dichroic filters.

Given the incident light angle and the desired propagation path (132) of the light departing from the dichroic filters, which can be along any desired direction, the dichroic filters can be individually tilted relative to the corresponding incident light. Specifically, dichroic filter 122 can be tilted an angle of $\Omega_0$ from the X axis such that the light incident thereto has an incident angle $\theta_0$ can be reflected by dichroic filter to propagate along the desired direction 132.

In order to reflect the light incident traveling along the principal optical axis 130 toward the desired direction 132, dichroic filter 124 is tilted an angle of $\Omega_1$ from the X axis such that the light incident thereto has an incident angle $\theta_1$. The angles of $\Omega_1$ and $\theta_1$ can be determined by equation 1.

$$\Omega_1 = \Omega_0 + \delta_1/2$$

$$\theta_1 = \theta_0 + \delta_1/2 \qquad \text{(Equation 1)}$$

In order to reflect the light incident traveling along the principal optical axis 126 toward the desired direction 132, dichroic filter 120 is tilted an angle of $\Omega_2$ from the X axis such that the light incident thereto has an incident angle $\theta_2$. The angles of $\Omega_2$ and $\theta_2$ can be determined by equation 2.

$$\Omega_2 = \Omega_0 + \delta_1/2$$

$$\theta_2 = \theta_0 - \delta_2/2 \qquad \text{(Equation 2)}$$

Figure 2B:
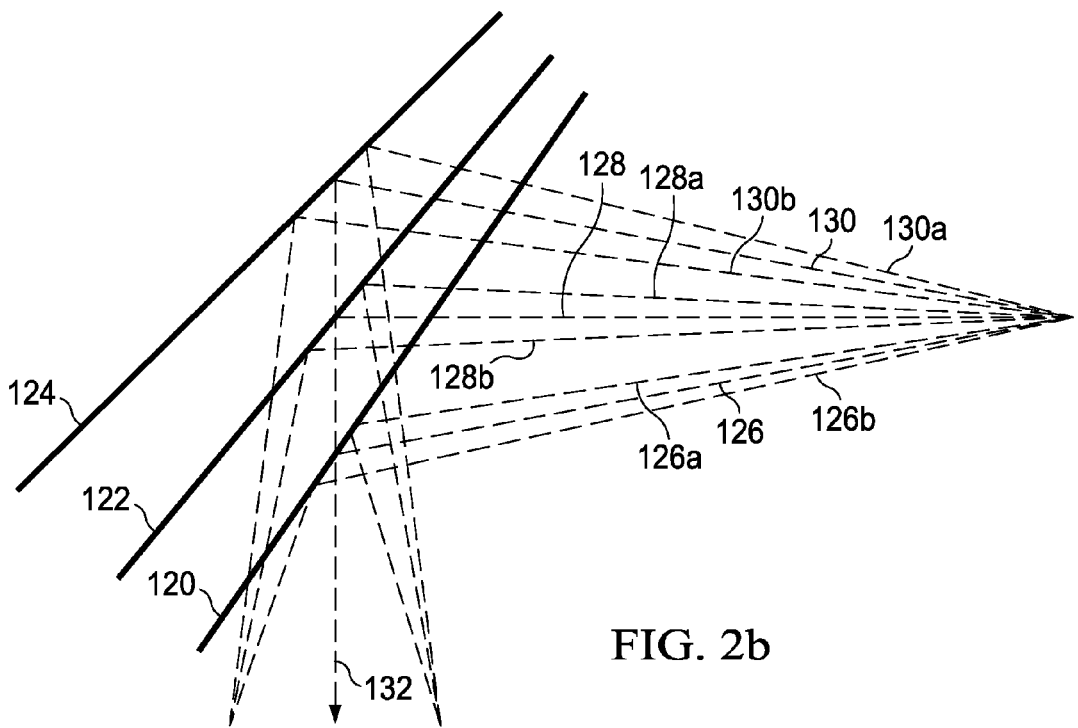
FIG. 2b and FIG. 2c are diagrams showing the spatial and angular coincidence of the light exit from the dichroic filters in the optical system of FIG. 1.
Figure 2C:
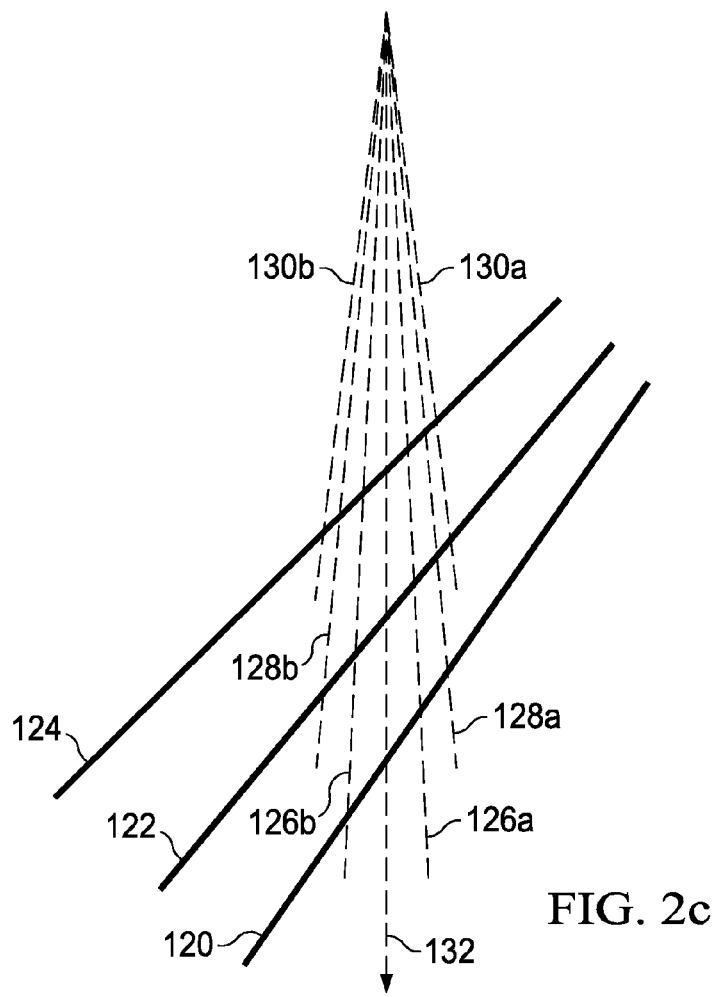

In examples when the light from each light source has angular divergence, the reflected light by the dichroic filters can be both angularly and spatially coincident as schematically illustrated in FIG. 2*b* and FIG. 2*c*.

Referring to FIG. 2*b*, dashed line 126, dash-and-doted line 128, and solid line 130 are principle optical axes as discussed above with reference to FIG. 2*a*. Dichroic filters 120, 122, and 124 are disposed in the same way as that in FIG. 2*a*. Dashed lines 126*a* and 126*b* are the edges of the light cone having the principal optical axis 126. Dash-and-dotted lines 128*a* and 128*b* are the edges of the light cone having the principal optical axis 128. Solid lines 130*a* and 130*b* are the edges of the light cone having the principal optical axis 130. It is noted that the light from the light sources (104, 106, and 108) may or may not have the same angular dispersion.

Due to the symmetry of each light cone in this example, i.e. the edges of each light cone are symmetrically located around the principal optical axis of the light cone, the spatial extension of the light cones from different light sources and reflected by different dichroic filters are spatially coincident. Specially, as schematically illustrated in FIG. 2*b*, the principal optical axes 126, 128, and 130 are substantially aligned along the desired direction 132; and the edges (126*a*, 126*b*, 128*a*, 128*b*, 130*a*, and 130*b*) of different light cones are substantially symmetrically located around the desired optical direction 132. The angular coincident of the reflected light cones by the dichroic filters is better illustrated in FIG. 2*c*.

Referring to FIG. 2*c*, the reflected light by the dichroic filters is retro-extended to show the angles of the line cones. It can be seen that the angles of the light cones from different light sources are substantially aligned, i.e. with the common central line along the desired optical path 132.

Figure 3:
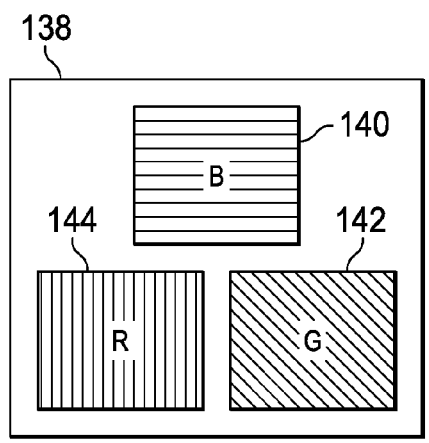
FIG. 3 schematically illustrates an exemplary arrangement of multiple light sources arranged in a two dimensional array.

The arrangement of the light sources in FIG. 1, which is a one dimensional array, is only one of many possible examples. In another example, the light sources can be arranged in a two-dimensional array, as schematically illustrated in FIG. 3. Referring to FIG. 3, the light source array comprises light sources 140, 142, and 144, which are solid state light sources (e.g. lasers, LEDs, or a combination thereof) for providing blue, green, and red colors in this example. In other examples, any desired combinations of light emitting devices for obtaining light of any desired color combinations can be employed. The light sources 10, 142, and 14 are arranged in a two-dimensional array; and can be formed on the same substrate, such as substrate 138. In other examples, the light sources can be formed on separate substrates. It is noted that the light sources in the light source array may or may not have the same physical size.

Figure 4:
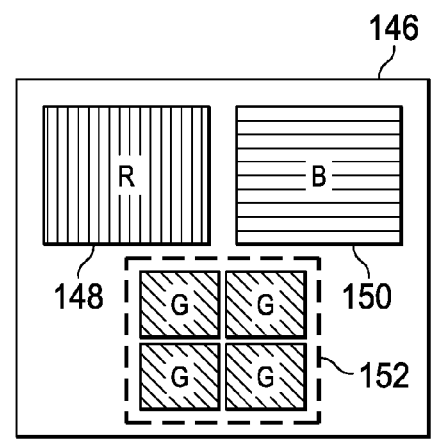
FIG. 4 schematically illustrates another exemplary arrangement of multiple light sources arranged in a two dimensional array.

As discussed above, the light of a specific color can be provided by multiple light sources that are capable of emitting light of substantially the same wavelength. FIG. 4 schematically illustrates such an example. Referring to FIG. 4, the light source array comprises light sources 148 and 150 for providing red and blue colors. The light source array may further comprise a light source sub-array 152 that comprises multiple light sources for providing light of substantially the same color, which is green in this example. The light sources in the light source array can be formed on the same package substrate, such as substrate 146, or can be formed on separate substrates, which is not shown in the figure. The light sources may or may not have the same physical size. As an example as illustrated in FIG. 4, the light sources for the green color may have a smaller physical dimension than the other two light sources 148 and 150. The sub-array 152 may have a different physical size as any one of the other two light sources 148 and 150. In practice, a light source may have any desired number of light source sub-arrays for different purposes. For example, multiple light source sub-arrays can be provided for providing light of red and green (or light of other colors) colors, as schematically illustrated in FIG. 5.

Figure 5:
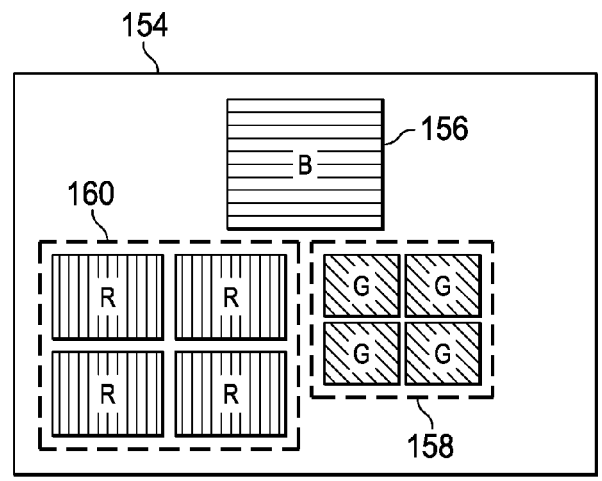
FIG. 5 schematically illustrates yet another exemplary arrangement of multiple light sources arranged in a two dimensional array.

Referring to FIG. 5, the light source array in this example comprises light source 156 for providing the blue light, light source sub-array 160 for providing the red light, and light source sub-array 158 for providing the green light. Each light source sub-array may have any desired numbers of light sources, and the light sources in the same light source sub-array may emit light of substantially the same color. The light source sub-arrays may or may not have the same physical size. All light sources in the light source array may be formed on the same substrate, such as substrate 154, or can be formed on separate substrates.

In examples wherein the light sources of the light source array are arranged in a two-dimensional array, the dichroic filters in the optical filter group can be tilted along different directions for appropriate angles so as to combine the propagation paths of the reflected light. For demonstration purpose, FIG. 6 schematically illustrates an exemplary optical system for directing light from the light sources that are arranged in a two-dimensional array.

Figure 6:
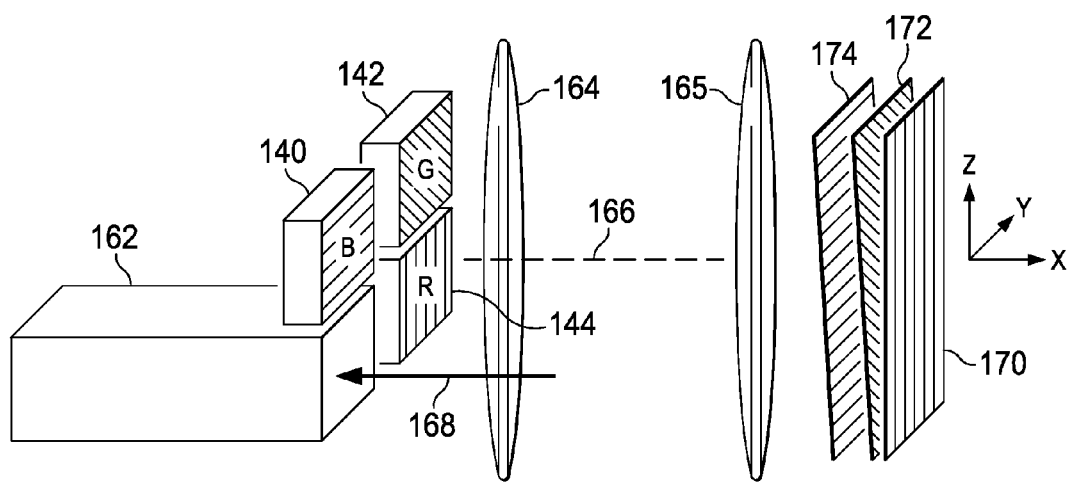
FIG. 6 is a diagram of another exemplary optical system for directing light from light sources that are arranged in a two dimensional array using a set of dichroic filters.

Referring to FIG. 6, light sources 140, 142, and 144 are disposed in a two-dimensional array. The light from the light sources are directed to dichroic filters 170, 172, and 174 through field lens 164 and imaging optic 165. In one example, the principal optical axis 166 of the light sources 140, 142, and 146 can be parallel to the principal optical axis of the collimation lenses and the dichroic filters. The light from the individual light sources are reflected by the corresponding dichroic filters 170, 172, and 174; and the reflected light is re-imaged at the entrance to optical integrator 162. The imaging is accomplished with 2 passes through imaging optic 165 and filter 170, 172 or 174 (depending on the color). The field lens 164 can have a focal length that is roughly the distance between the light sources and the filters and which causes light from the sources to overlap at optic 165 and ensures that the differently color light entering optical integrator 162 has an overlapping angular distribution. Other types of optics can be used to perform the functions of field lens 164 and imaging optic 165 such as multiple lenses, curved reflectors, Fresnel lenses, etc. The tilt angles of the individual dichroic filters 170, 172, and 174 relative to the incident light are better illustrated in FIG. 7 through FIG. 9b.

Figure 7:
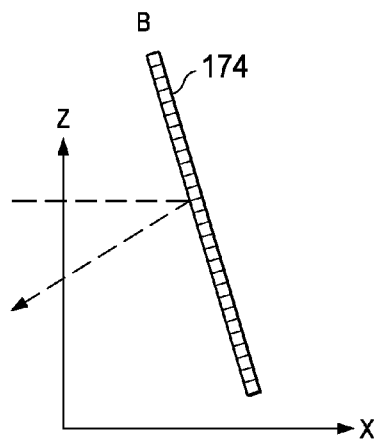
FIG. 7 schematically illustrates the XZ plane projection of the blue color dichroic filter in the optical system as illustrated in FIG. 6.

Referring to FIG. 7, a side view of dichroic filter 174 along the Y direction in the Cartesian coordinate that is illustrated in FIG. 6 is schematically illustrated therein. As seen in the XZ plane, dichroic filter 174 is rotated around the Y axis such that the light from light source 140 (illustrated in FIG. 6) is reflected towards the entrance of the optical integrator (162 as illustrated in FIG. 6).

Figure 8:
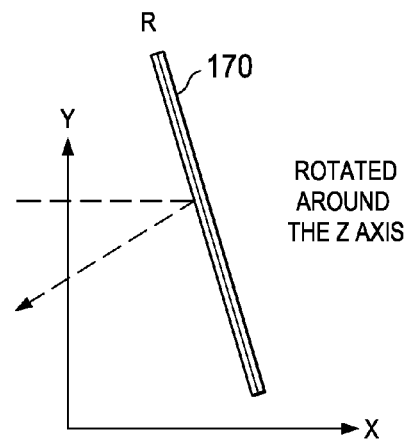
FIG. 8 schematically illustrates the XY plane projection of the red color dichroic filter in the optical system as illustrated in FIG. 6.

Referring again to FIG. 6, for reflecting the light from light source 144, dichroic filter 170 is rotated around the Z axis for an angle such that the light from light source 144 is reflected towards the entrance of optical integrator 162, as schematically illustrated in FIG. 8, wherein a side view of dichroic filter around the Z axis of the Cartesian coordinate is schematically illustrated therein.

Figure 9A:
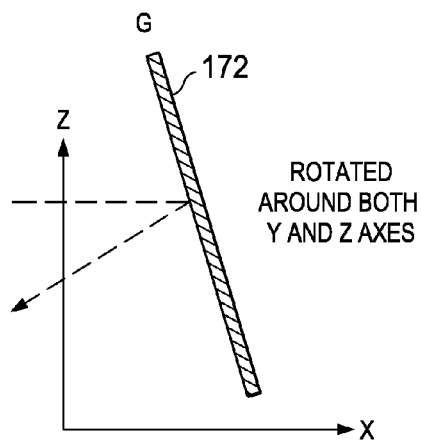
FIG. 9a schematically illustrates the XZ plane projection of the green color dichroic filter in the optical system as illustrated in FIG. 6.
Figure 9B:
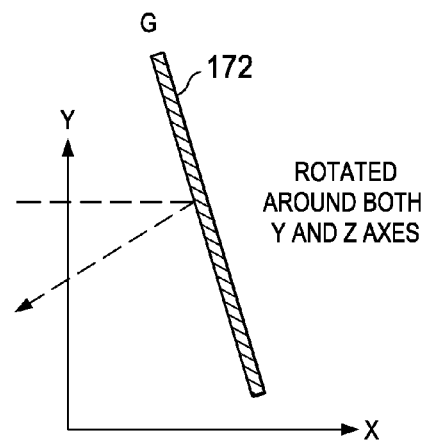
FIG. 9b schematically illustrates the XY plane projection of the green color dichroic filter in the optical system as illustrated in FIG. 6.

For reflecting the light from light source 142 by dichroic filter 172, dichroic filter 172 is rotated around both of the Y and Z axes, as schematically illustrated in FIG. 9a and FIG. 9b. Referring to FIG. 9a, dichroic filter 172 is rotated around the Y axis for an angle such that the reflected light is substantially in the same horizontal plane as the entrance of the optical integrator (162 as illustrated in FIG. 6). Dichroic filter 172 is further rotated around the Z axis such for an angle such that the reflected light is moved to the entrance of the optical integrator.

When multiple light sources are employed for emitting light of the same color and the light sources are arranged in a two-dimensional array, such as that illustrated in FIG. 4 and FIG. 5, a dichroic filter can be provided for each light source. The dichroic filters can be individually tilted according to the physical arrangements of the light sources so as to cause the principal optical axes of the light sources to be aligned to a substantially common optical path after the dichroic filters. Alternatively, a dichroic filter can be provided for all light sources that emit light of substantially the same color. In this instance, a dichroic filter can be tilted according to all light sources that emit light of substantially the same color. For example with reference to FIG. 5, a dichroic filter for light source sub-array 158 can be tilted for an angle according to the principal axis for substantially all light sources in light source sub-array 158.

The light from the light sources can be directed to the dichroic filters by collimation lens as discussed above with reference to FIG. 1. Alternatively, optical integrators can be employed with the collimation lens for directing the light from the light sources. In one example, FIG. 10 schematically illustrates an optical system that employs optical integrators and collimation lens for directing light from the light sources arranged in a one-dimensional array as illustrated in FIG. 1 to dichroic filters.

Figure 10:
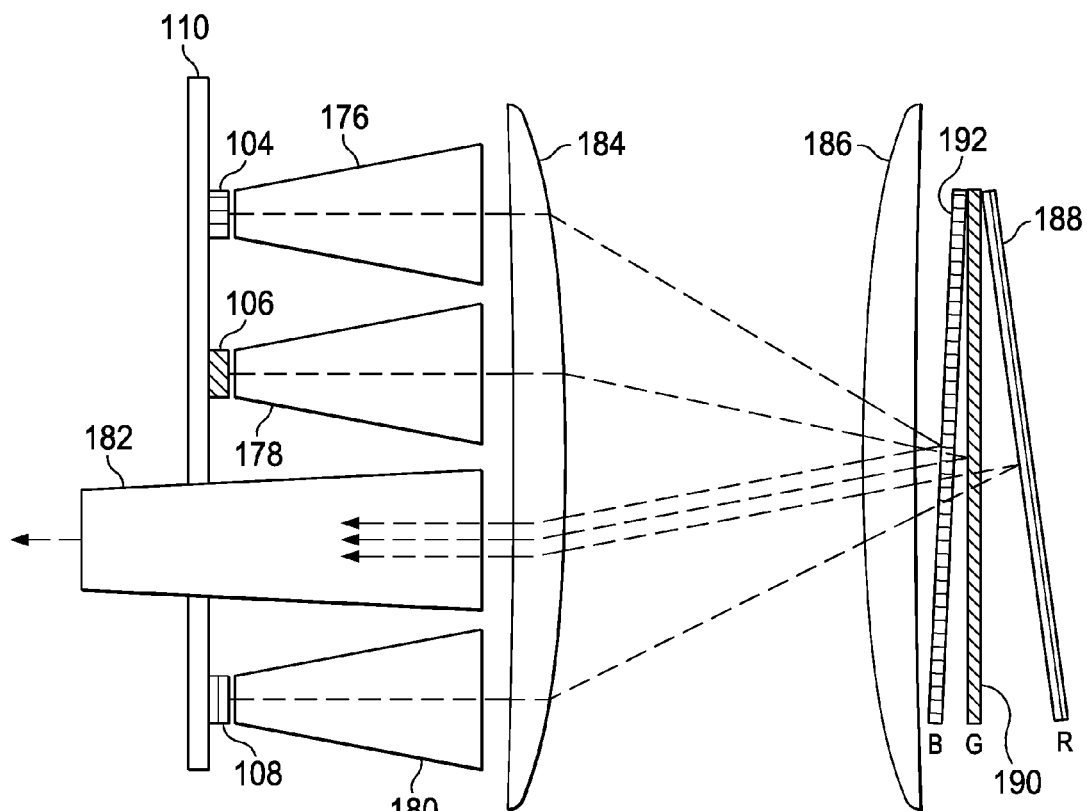
FIG. 10 is a diagram of an exemplary optical system for directing light from light sources using a set of dichroic filters and light guides.

Referring to FIG. 10, light sources 104, 106, and 108 are arranged in a one-dimensional array, and can be formed on substrate 110. Optical integrators 176, 178, and 180 are provided and are disposed such that the entrances of the optical integrators are respectively aligned to the light sources 104, 106, and 108 for collecting the light from the light sources. The principal axes of the optical integrators are substantially parallel, for example, to the principal optical axis of the optical system. In this example the optical integrators are tapered waveguides and also serve to narrow the angular distribution of the light from the light source. Light exiting from the optical integrators are overlapped and collimated by lenses 184 and 186 as in FIG. 6; and are then directed to the dichroic filters 188, 190, and 192. The dichroic filters 188, 190, and 192 reflect the incident light towards the entrance of optical integrator 182 that delivers the reflected light to other devices, such as a light valve of an imaging system.

The dichroic filters 188, 190, and 192 and lenses 184, 186 are placed in a way such that the principal optical axes of the light from light sources 104, 106, and 108 can be combined along the desired direction. In particular, angular and spatial extension of the light emitted from the light sources and reflected by the dichroic filters can be substantially coincident at the entrance of optical integrator 182.

The optical integrators 176, 178, and 180 each can take any desired forms. In the example as illustrated in FIG. 10, the optical integrators 176, 178, and 180 have tapered edges with the narrow entrances being coupled to the light sources and the wider exits being coupled to the collimation lens. Alternatively, a tapered optical integrator can be replaced by an optical integrator with any desired forms. For example, an optical integrator with curved edges can be used. For another example, an optical integrator can be non-tapered. In other examples, any one of the optical integrators can be replaced by or used with other optical devices, such as optical fibers and/or interference-type optical devices (e.g. interference gratings). The optical integrators (176, 178, and 180) can be formed or derived from a molded material, such as a molded plastic, which can reduce the cost of the optical system.

Figure 11:
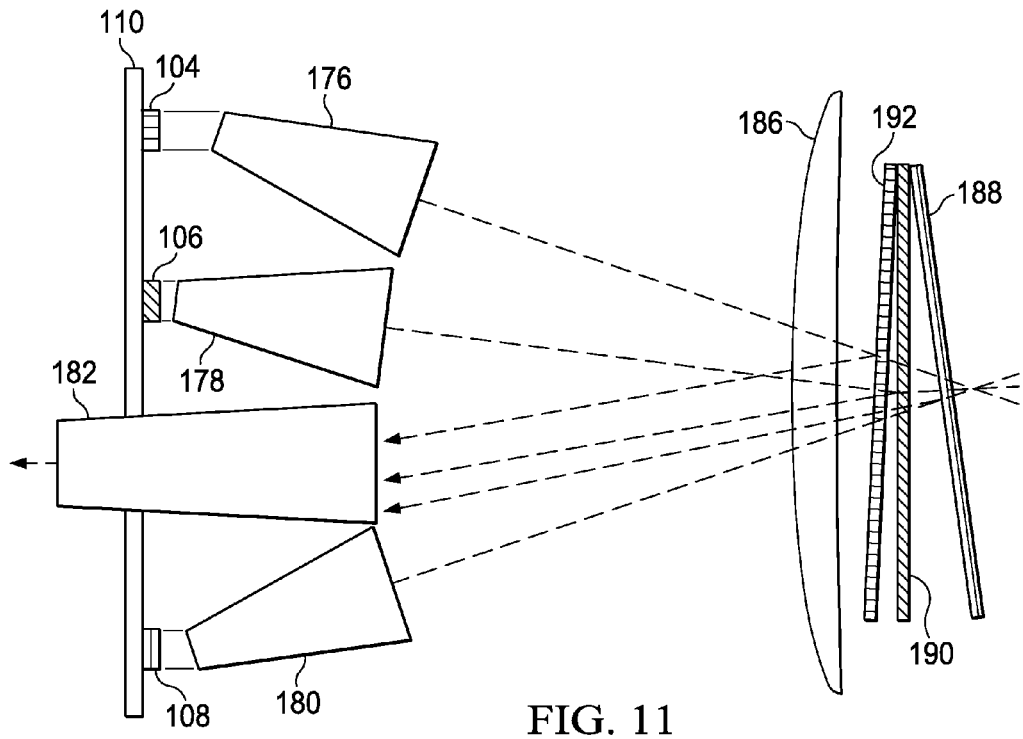
FIG. 11 is a diagram of another exemplary optical system for directing light from light sources using a set of dichroic filters and light guides.

In another example, the optical integrators (176, 178, and 180) can be tilted such that the principal optical axes of the optical integrators are converged to substantially a single point, as schematically illustrated in FIG. 11. In this instance, collimation lens 184 to overlap the light beams may not be necessary.

Referring to FIG. 11, optical integrators 176, 178 and 180 are tilted individually such that the principal optical axes of the optical integrators are converged. The combination of lens 186 and the dichroic filters (188, 190, and 192) images the exits of the optical integrators (176, 178, and 180) onto the entrance of optical integrator 182 by which the reflected light from the dichroic filters are collected and delivered, for example to a light valve. Accordingly, the dichroic filters are tilted individually according to the directions of the principal optical axes of the optical integrators 176, 178, and 180. As a consequence, the reflected light from the dichroic filters can be angularly and spatially coincident, for example, in a way as discussed above with reference to FIG. 2a through FIG. 2c.

Figure 12:
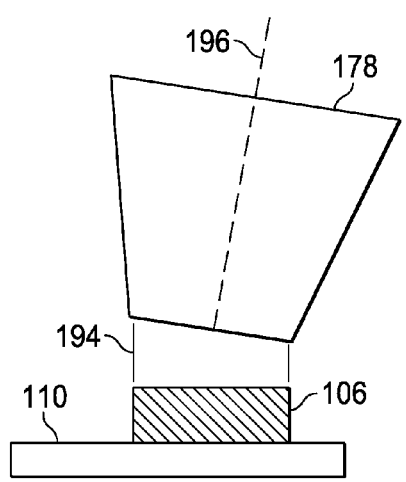
FIG. 12 schematically illustrates an example of coupling a light source to a light guide using an intermediate light guide.

The optical integrators (176, 178, and 180) can be coupled to the light sources in many ways, one of which is schematically illustrated in FIG. 12. Referring to FIG. 12, light source 106 is one substrate 110. The entrance of optical integrator 178 is coupled to light source 106 through optical integrator 194. Because the principal optical axis of optical integrator 178 is tilted, the entrance of optical integrator 178 may not be parallel to the plane of light source 106, or may not be perpendicular to the principal optical axis of light source 106. For this reason, the intermediate integrator 194 has an entrance this is not parallel to its exit. Instead, the entrance of the intermediate integrator 194 is substantially parallel to the plane of light source 106; and the exit of the intermediate integrator 194 is substantially parallel to the entrance of integrator 178. To improve the optical performance, the interfaces between the intermediate integrator 194 and the tilted integrator 178 can be filled with a suitable optical material, such as an optical film for enhancing the transmission of the interface. Instead of using an intermediate integrator, an optical integrator may be directly coupled to an light source as schematically illustrated in FIG. 13.

Figure 13:
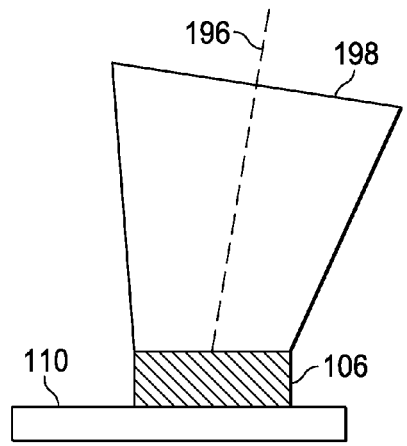
FIG. 13 schematically illustrates another example of coupling a solid-state light source to a light guide.

Referring to FIG. 13, optical integrator 198 in this example has an entrance that is parallel to plane of light source 106; while the principal optical axis 196 is tilted along the desired direction. The exit of optical; integrator 198 may or may not be parallel to the entrance of the optical integrator. Alternatively, the light source 106 can be tilted so that the optical axis 196 is normal to the light source surface.

Figure 14:
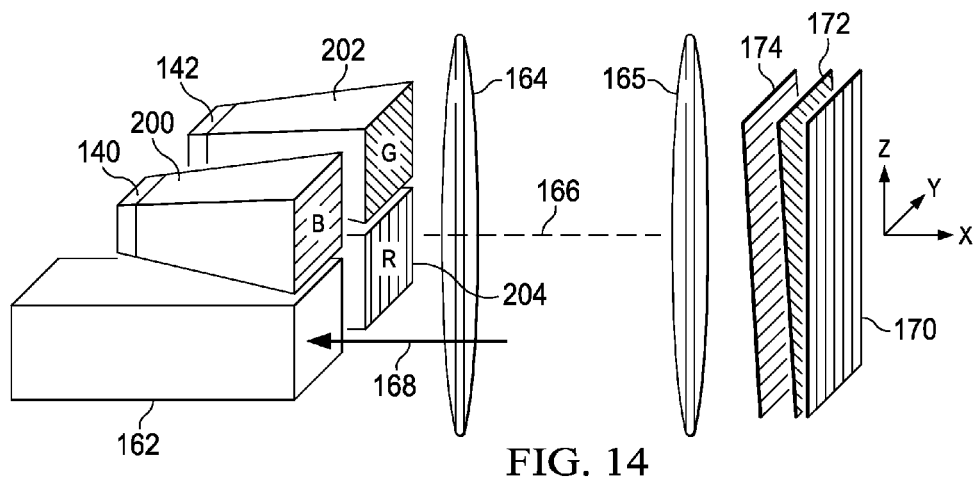
FIG. 14 is a diagram of another exemplary optical system for directing light from light sources using a set of dichroic filters and light guides, wherein the light sources are arranged in a two-dimensional array.

Optical integrators can also be used for directing light from light sources that are arranged in two-dimensional arrays, an example of which is schematically illustrated in FIG. 14.

Referring to FIG. 14, light sources 140, 142, and 144 (not shown, behind optical integrator 204) are arranged in a two-dimensional array as that discussed above with reference to FIG. 6. Optical integrators 200, 202, and 204 are disposed approximate to the light sources. Specifically, the narrow entrance of each one of the optical integrators (200, 202, and 204) is disposed approximately to a light source for collecting the light from the light sources. The wider exit of each optical integrator (200, 202, and 204) is opened towards collimation lenses 164 and 165 and dichroic filters 170, 172, and 174. The dichroic filters 170, 172, and 174 can be disposed in the same way as that discussed above with reference to FIG. 7 through FIG. 9b. The reflected light from the individual dichroic filters are collected by the entrance of optical integrator 162 that delivers the collected light to other devices, such as a light valve. At the entrance of the optical integrator 162, the reflected light from individual dichroic filters can be spatially and angularly coincident.

The optical system as discussed above, as well as many other variations, has many applications, one of which is an imaging system. For demonstration purposes, FIG. 15 schematically illustrates a diagram of an exemplary imaging system in which an exemplary optical system is implemented therein.

Figure 15:
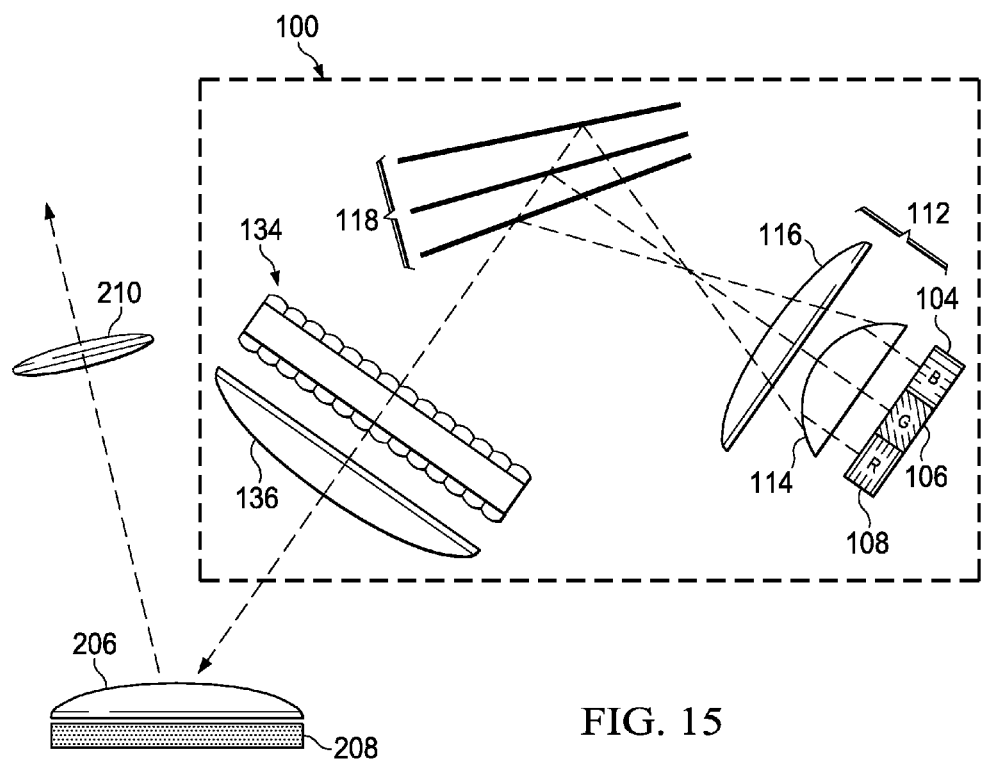
FIG. 15 schematically illustrates an exemplary imaging system employing the exemplary optical system as illustrated in FIG. 1 and a light valve.

Referring to FIG. 15, optical system 100 is the same as that discussed above with reference to FIG. 1. Specifically, optical system 100 comprises light sources 104, 106, and 108, collimation optics 112 that further comprises lenses 114 and 116, optical filter group 118, fly's eye lens arrays 134 and 136. The light from the optical filters is directed to light valve 208 through field lens 206 that can be disposed proximal to the light valve. The light valve modulates the incident light according to image data (e.g. bitplane data) associated with desired images. The modulated light is then directed to projection lens 210 that projects the modulated light onto a screen.

In addition to enabling the spatial and angular coincidence of the reflected light by the dichroic filters, the optical configuration of the optical system may also enables the optical length between the light sources and the light valve (208) to be substantially the same. As a consequence, the light sources can be directly imaged onto the light valve, which has many benefits, such as enabling the compact optical system and/or the imaging system using the optical system.

The light valve in this example comprises an array of individually addressable pixels that can be reflective or transmissive. For example, the light valve or light valves may comprise one or more reflective micromirror devices, or one or more liquid-crystal-on-silicon devices.

In the examples as illustrated above in FIG. 1 and FIG. 15, fly's eye lens array 134 is provided for generating a uniform illumination field of the reflected light at the location of the light valve. The fly's eye lens array can be implemented in many ways, one of which is schematically illustrated in FIG. 16.

Figure 16:
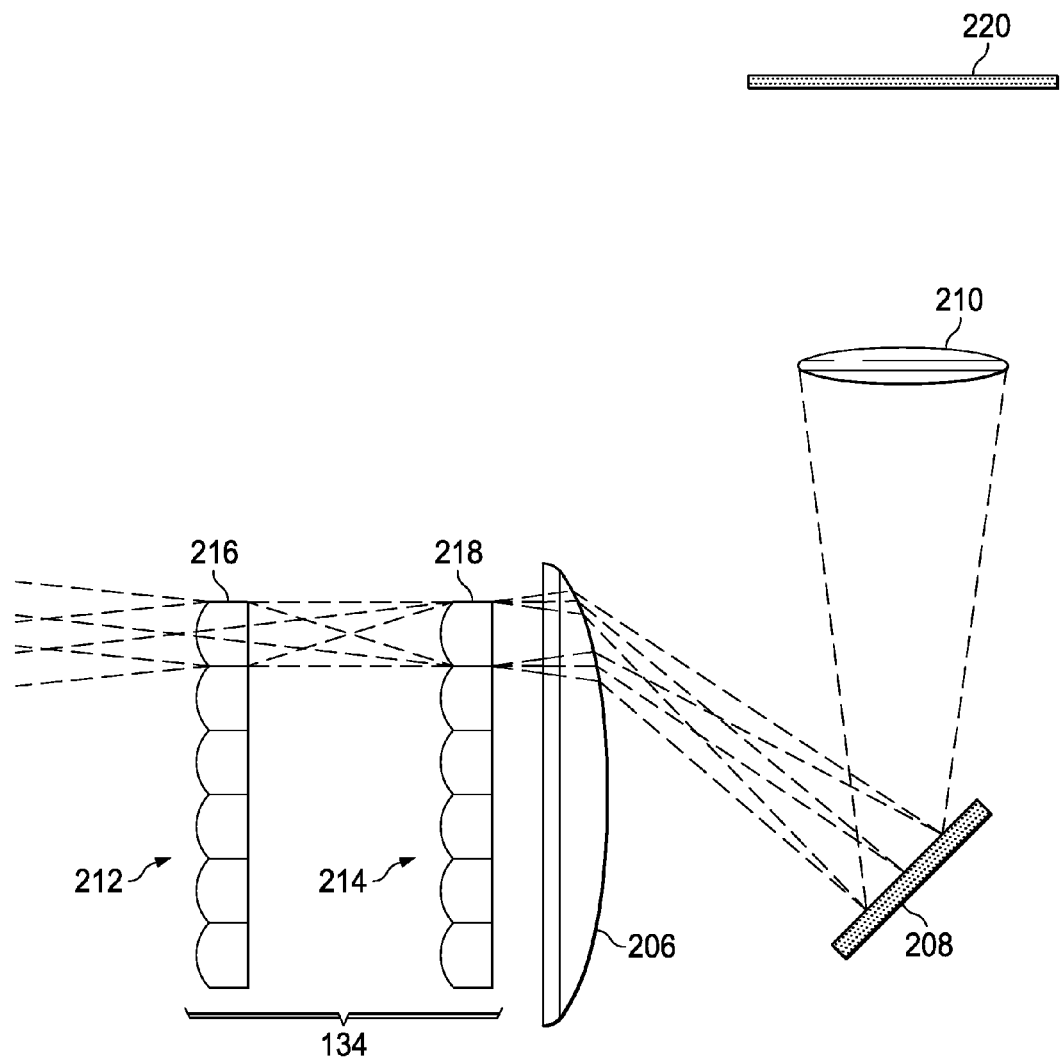
FIG. 16 schematically illustrates an exemplary optical configuration for the fly's eye lens array in the imaging system in FIG. 15.

Referring to FIG. 16, fly's eye lens array 134 comprises front lenticular array 212 and rear lenticular array 214. This is alternative to the one-piece design where there is an array on each side of a single optical element. The lenslets in each lenticular array can have any desired form, such as a cubical lens, a spherical lens, aspherical lens, semi-spherical lens, or other types of lenses. The lenslets in the lens arrays are individually associated with each other such that, with field lens 206 after the rear lens array 218, the light from a lenslet (e.g. lenslet 216) in the front lens array can be spread across substantially the entire area of light valve 208. As a consequence, the light passed by the lenslets in the front lens array (216) are optically integrated at the location of light valve 208 after the lenslets in the rear lens array 214 and field lens 206. The optical integration of the light results in a highly uniformed illumination field at the location of the light valve. The light valve modulates the light incident thereto based upon image data associated with desired images; and the modulated light is projected to screen 220 through projection lens 210.

Figure 17:
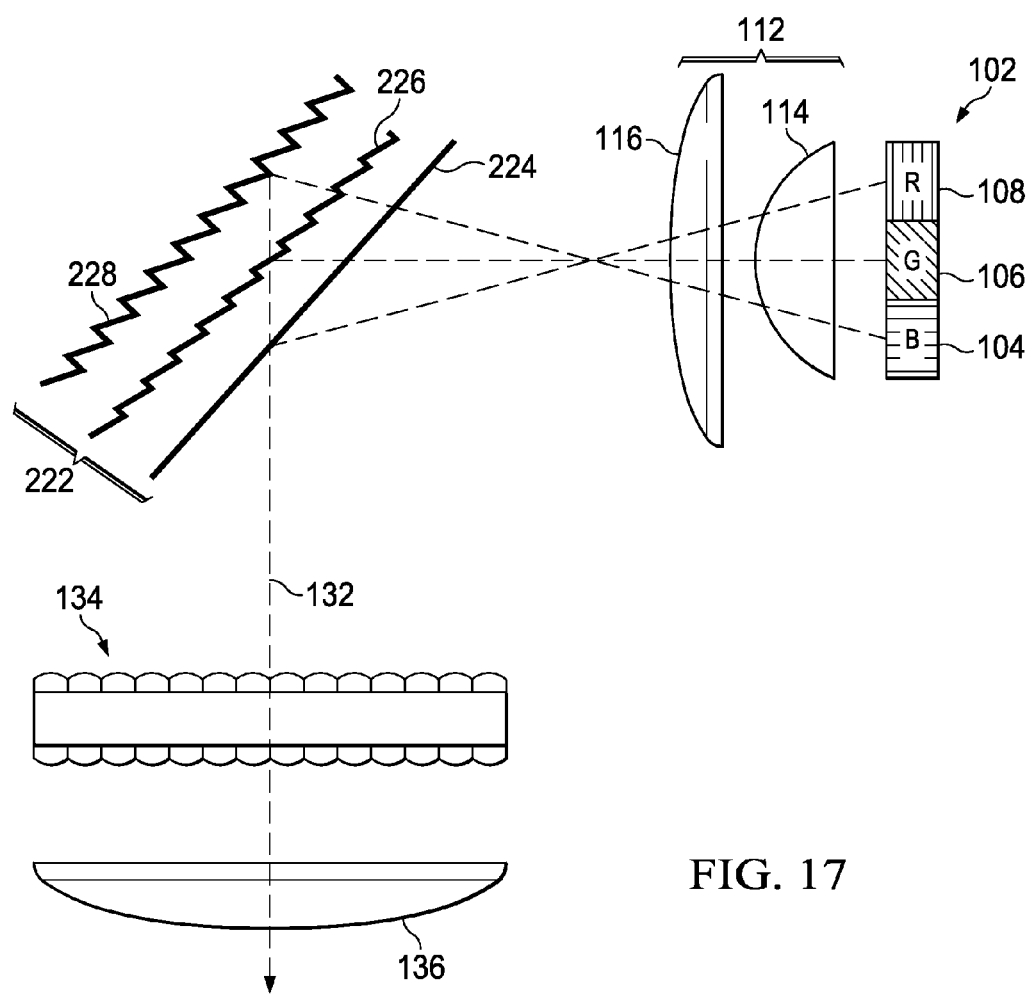
FIG. 17 schematically illustrates another exemplary optical system for directing light from a set of light sources using a set of dichroic filters, wherein the dichroic filters have saw-tooth structures.

In addition to standard dichroic filters wherein the reflective surfaces of the dichroic filters are continuous, a dichroic filter can be configured to be segmented, such as in a saw-teeth arrangement, as schematically illustrated in FIG. 17. Referring to FIG. 17, optical filter group 222 in this example comprises dichroic filter 224, dichroic filter 226, and reflective optical element 228. Dichroic filter 224 is a standard dichroic filter with a surface for reflecting the collimated light that is emitted from light source 108 and collimated by collimation optics 112, which comprises lenses 114 and 116.

Dichroic filter 226 in this example comprises a segmented saw-tooth structure that forms a reflective surface. The geometric configuration, such as the period, the angles, and the height, of the segments of dichroic filter 226 can be determined by the optical properties, such as the wavelength and the incident angle of the light from light source 106 to take into account interference effects. Alternatively, the segments can be much larger than the wavelength of light from the light source. The segments of dichroic filter 226 are rotated such that the light traveling along the principal optical axis of light source 106 can be reflected towards the desired direction 132 by dichroic filter 226.

Similarly, reflective optical element 228 in this example comprises saw-tooth fine structures that form a reflective surface. The geometric configuration of the saw-teeth of reflective optical element 228 can be determined by the optical properties of the light from light source 104. Reflective optical element 228 is rotated such that the light traveling along the principal optical axis of light source 104 can be reflected towards the desired direction 132.

With the optical structure as illustrated in FIG. 17, the light from light sources 104, 106, and 108 can be directed to propagate along the desired direction 132. The reflected light can be spatially and angularly coincident, as schematically illustrated in FIG. 2a through FIG. 2c. Using the segmented approach, the optical designer has an extra degree of freedom with which to combine the light beams to be more spatially and angularly coincident.

The dichroic filters with segmented structures can also be employed for directing light from light sources that are arranged in two-dimensional arrays, such as an array illustrated in FIG. 3 through FIG. 5. In particular, the dichroic filter segments can be rotated individually based upon the physical arrangements of the light sources in the two-dimensional light source array as discussed above with reference to FIG. 7 through FIG. 9b, which will not be repeated herein.

Figure 18:
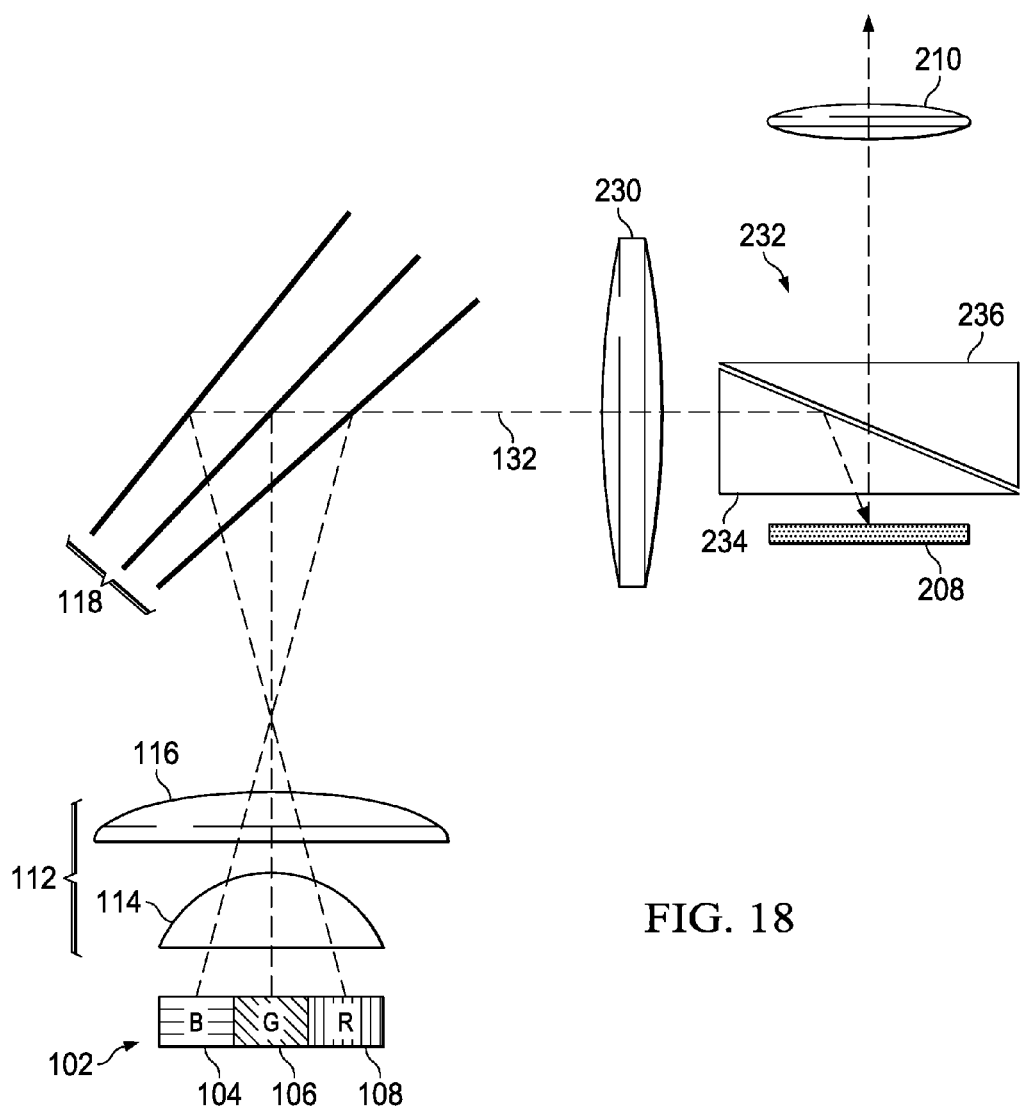
FIG. 18 schematically illustrates another exemplary imaging system employing the exemplary optical system as illustrated in FIG. 1, a prism, and a light valve.

For demonstration purposes, another exemplary imaging system that employs an exemplary optical system is schematically illustrated in FIG. 18. Referring to FIG. 18, light source 102 comprising light sources 104, 106, and 108 are arranged in a one-dimensional array for providing light. The light from the light source array is directed optical filter group 118 through collimation optics 112 that comprises lenses 114 and 116. The optical filter group (118) comprises a set of dichroic filters for individually reflecting the light from the light sources toward the desired direction 132. The placements of the dichroic filters can be the same as that discussed above with reference to FIG. 1. The reflected light traveling along the desired direction 132 is directed toward prism assembly 232 through lens 230.

The prism assembly (232) comprises prisms 234 and 236 that form a totally-internally-reflective interface (TIR) that reflects the incident light onto light valve 208. The light valve (208) comprises an array of individually addressable pixels for modulating the incident light. The modulated light passes through prism 236; and is projected by projection optic 210 that images the modulated light onto a screen. In this example no light integrator such as a fly eye lens or light tunnel is shown, although one could be added. In this example the light sources 104, 106, 108 can be directly imaged onto the light valve 208.

Figure 19:
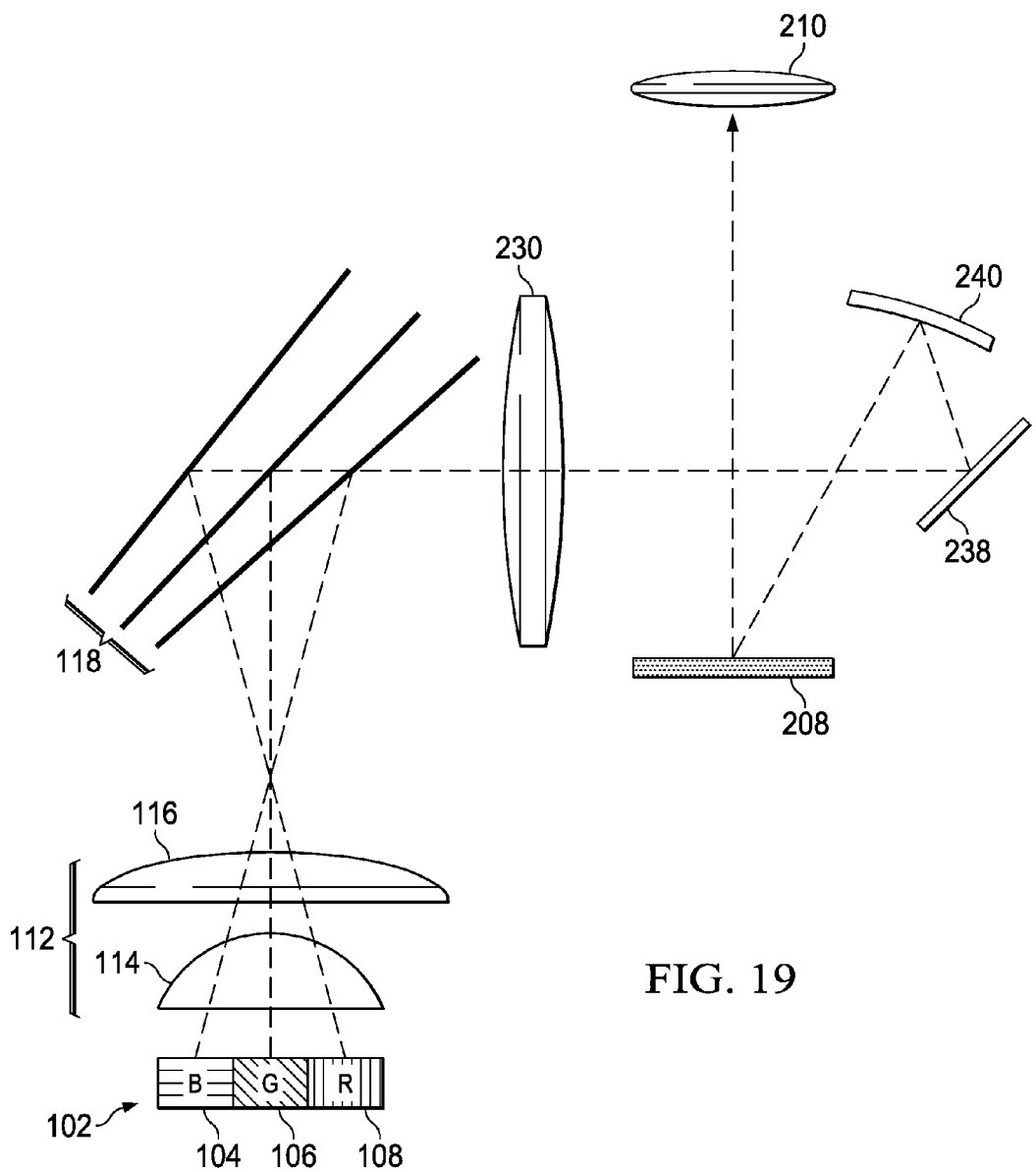
FIG. 19 schematically illustrates yet another exemplary imaging system employing the exemplary optical system as illustrated in FIG. 1 and a light valve.

Another exemplary imaging system employing an optical system of this disclosure is schematically illustrated in FIG. 19. Referring to FIG. 19, light source 102 (which further comprises light sources 104, 106, and 108), collimation optics 112 (which further comprises lenses 114 and 116), optical filter group 118, and lens 230 can be the same as that discussed above with reference to FIG. 18. The light after the dichroic filters and lens 230 is directed to mirror 238 that reflects the incident light onto a curved reflective surface of mirror 240. The curved reflective mirror condenses the incident light onto light valve 208 that modulates the incident light using an array of individually addressable pixels. The modulated light is then collected and projected by projection optics 210.

It is noted that the imaging system as discussed above with reference to FIG. 18 and FIG. 19 are only two of many possible examples. Other variations are also applicable. For example, the light source array in each one of the imaging systems can comprise light sources that are arranged in two-dimensional arrays. In these examples, the dichroic filters can be arranged accordingly, such as that discussed above with reference to FIG. 7 through FIG. 9b.

Figure 20:
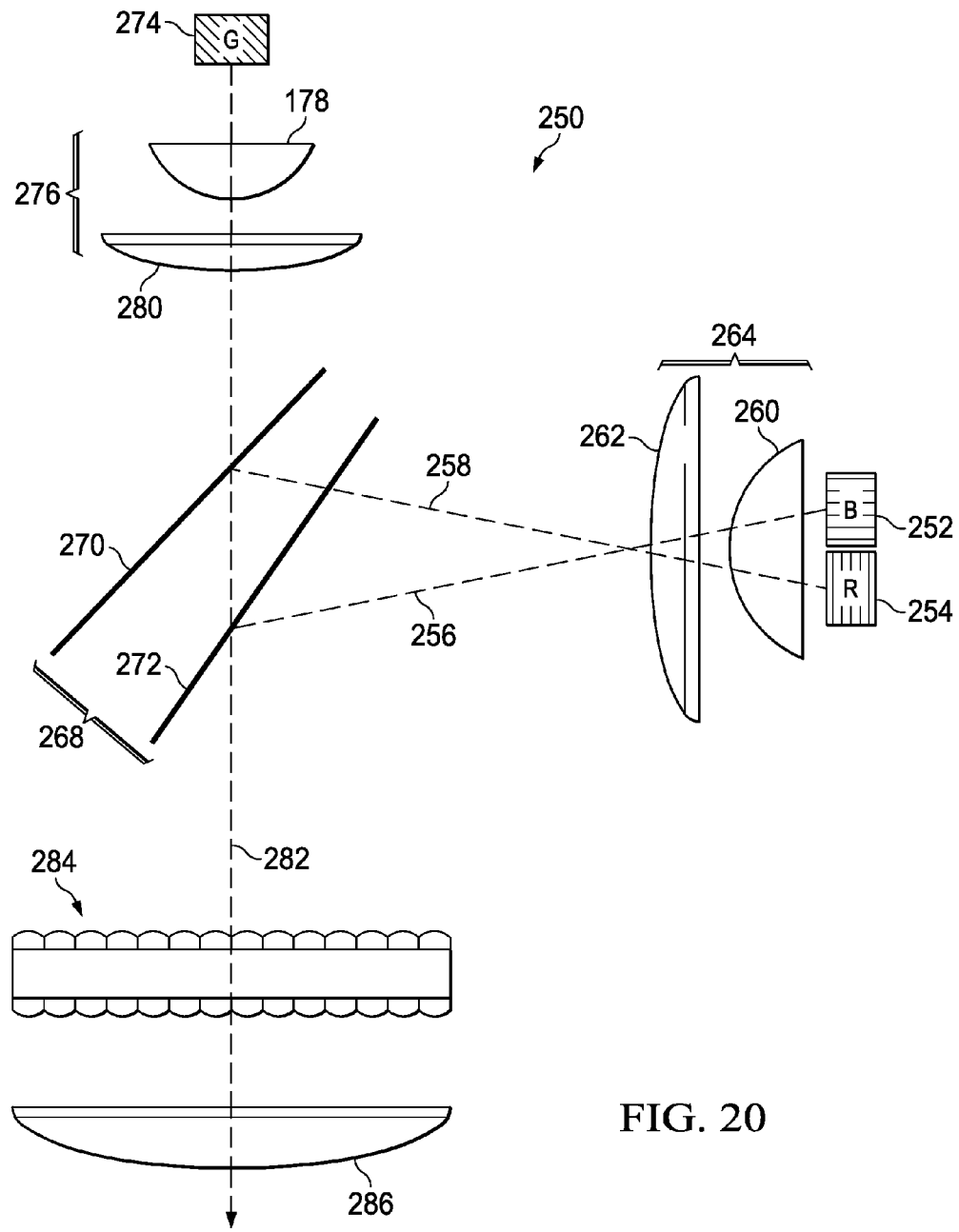
FIG. 20 is a diagram of an exemplary optical system for combining light from multiple light sources in an imaging system using a set of dichroic filters.

Another exemplary imaging system employing an optical system of this disclosure is schematically illustrated in FIG. 20. Referring to FIG. 20, light sources 252, 254, and 274 provide light of different colors, such as colors selected from red, green, blue, yellow, cyan, magenta, or any combinations thereof. In this example, light sources 252, 254, and 274 provide blue, red, and green light, respectively.

Light from light sources 252 and 254 is directed to filter group 268 that comprises dichroic filters 270 and 272. The dichroic filters 270 and 272 have different filter properties. Examples of dichroic filters can be thin film interference filters.

Dichroic filter 270 reflects red light and transmits green light, whereas dichroic filter 272 reflects blue light and transmits red and green light. The dichroic filters 270 and 272 are placed in a way such that the principal optical axes of the light from light sources 252 and 254 can be combined into the desired direction 282, as discussed above with reference to FIG. 1 through FIG. 2c, which will not be repeated herein.

Light source 274 can be disposed such that the principal optical axis of the light from light source 274 is substantially aligned to the desired direction 282. As a consequence, the light from light source 274 can propagates along the desired direction after the collimation lens group 276 that further comprises lenses 178 and 280, dichroic filters 270 and 282.

The light after the dichroic filters 270 and 272 can be directed to other optical elements, such as fly's eye lens array 284 and field lens 286; and the light after the optical elements can be directed to a light valve for illuminating the light valve. In another example, the light after the dichroic filters 270 and 272 can be directed to optical elements, such as the optical elements 230 and 232 as illustrated in FIG. 18, or can be directed to mirror 238 and curved mirror 240 as illustrated in FIG. 19 before being directed to a light valve.

Figure 21:
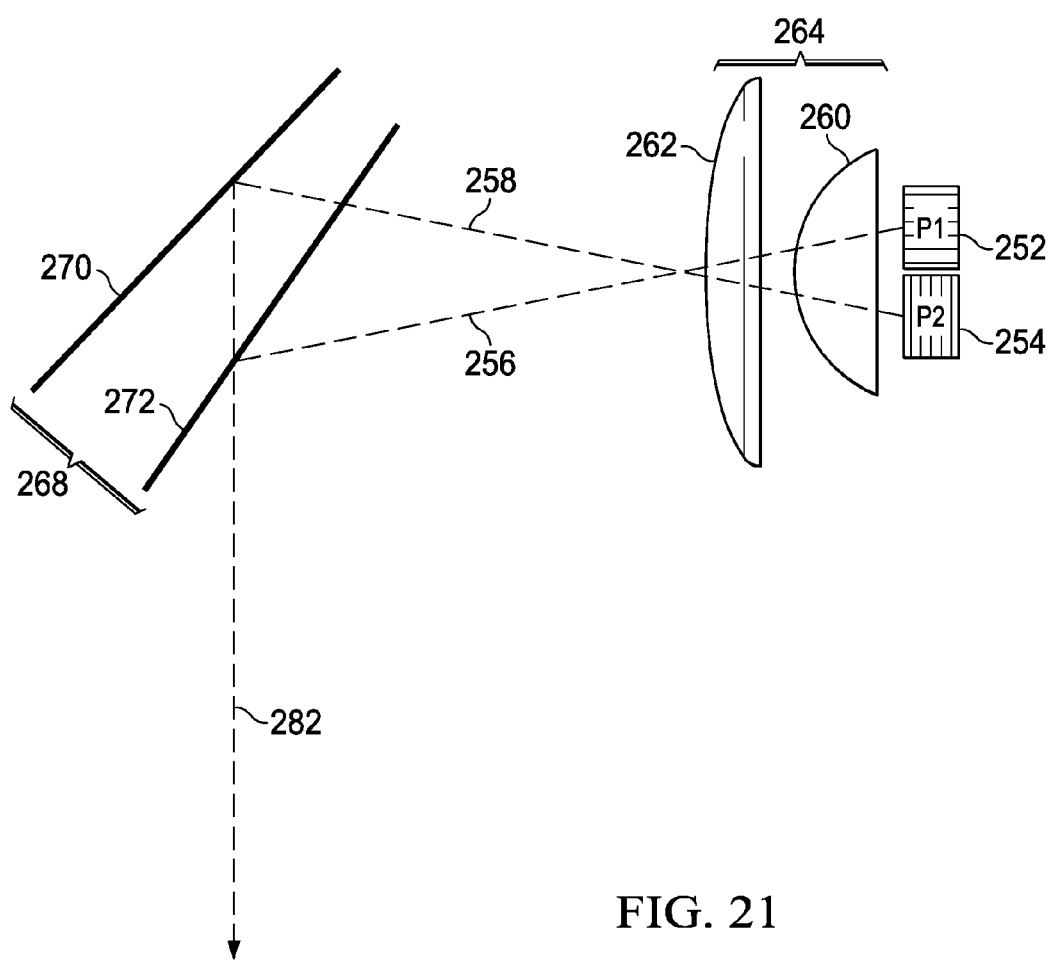
FIG. 21 is a diagram of an exemplary optical system for combining light from multiple polarized light sources in an imaging system using a set of optical filters.

The optical systems as discussed above are also be used for direction polarized light from light sources by replacing the dichroic filters of the optical systems as discussed above with reflective polarizing filters, and example of which is schematically illustrated in FIG. 21. Referring to FIG. 21, light sources 252 and 254 provide polarized light of different polarization states.

Polarized light from light sources 252 and 254 is directed to polarize filter group 268 that comprises reflective polarizing filters 270 and 272. In this example the sources are can have linear or circular polarization states. The reflective polarizing filters 270 and 272 have different polarization transmission and reflection properties. Examples of reflective polarizing filters are wire grid polarizers. Specifically, the polarized light from light source 252 is reflected by filter 272, and the polarized light from light source 254 is transmitted by filter 272.

When a wire-grid polarizer is employed as reflective polarizing filters 272, the polarization direction of the polarized light from light source 252 can be parallel to the direction of the grids in the wire-grid polarizer. In another example, polarizing optics can be placed between filter 272 and the light emitting device in light source 252 for adjusting the polarization state of the polarized light from light source 252.

For passing the polarized light from light source 254, reflective polarizer filter 272 can have a polarization transmission characteristics that transmits polarized light from light source 254. In examples wherein the polarization transmission characteristic of the filter 272 and the polarized light from light source 254 do not match, polarization-modifying optics such as optical retarders or polarization rotation optics can be placed between filter 272 and the light emitting device of light source 254 for adjusting the polarization state of the polarized light from light source 254.

For reflecting the polarized from light source 254, reflecting polarizing filter 270 can be a simple mirror in this example. Polarization-modifying optics such as optical retarders or polarization rotation optics can be placed between filters 270 and 272, or between filters 270 and the light emitting devices in light sources 252 and 254 as stated above.

The reflective polarizing filters 270 and 272 are placed in a way such that the principal optical axes of the polarized light from light sources 252 and 254 can be combined into the desired direction 282, as discussed above with reference to FIG. 1 through FIG. 2c, which will not be repeated herein.

The polarized light after the reflective polarizing filters 270 and 272 can be directed to other optical elements, such as a set of dichroic filters to combine light of different colors, fly's eye lens arrays, and other optical elements as shown in the previous figures.

Figure 22:
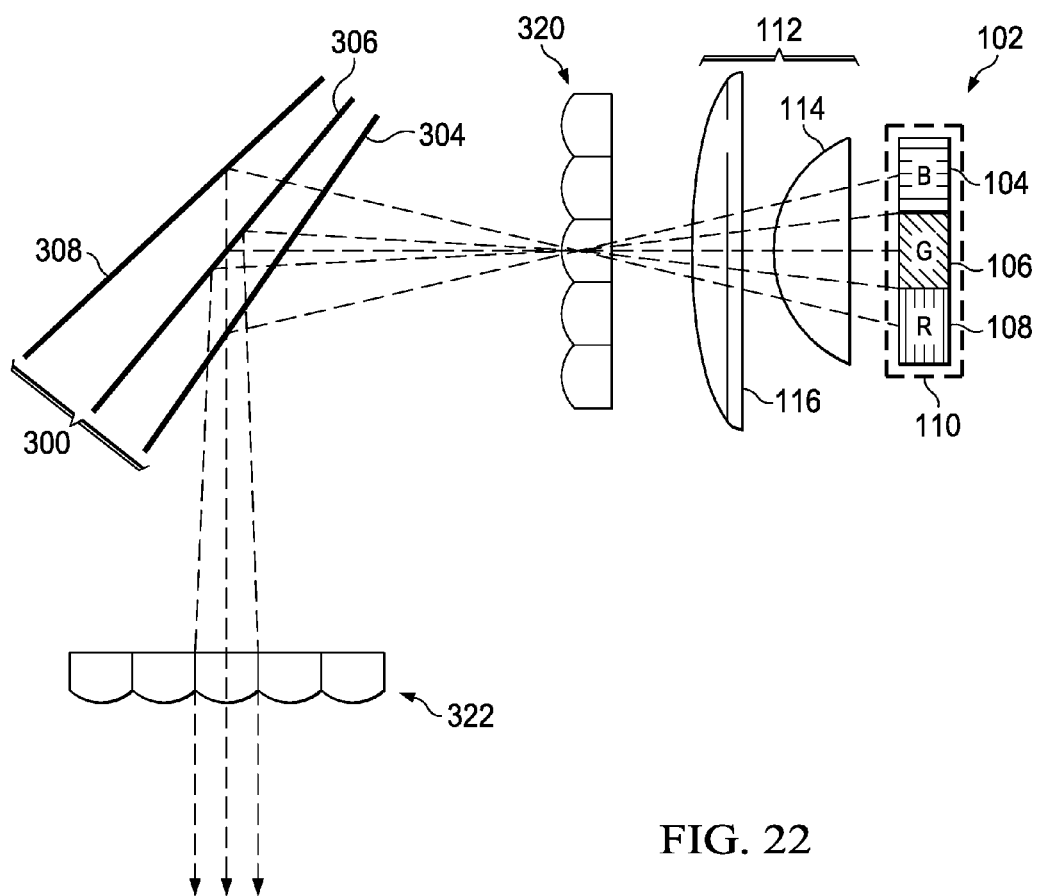
FIG. 22 is a diagram of an exemplary optical system for combining light from multiple light sources in an imaging system using a set of dichroic filters positioned between two fly's eye lens arrays.

FIG. 22 shows an optical system for combining light from multiple light sources in an imaging system using a set of dichroic filters positioned between two fly's eye lens arrays. Light from sources 104, 106, 108 is collimated by lens group 112 and enters fly's eye lens array 320 with a light distribution from each source uniform in angle. Light entering a single lenslet in entrance array 320 reflects from optical filter group 300 as in FIG. 1 and exits a corresponding lenslet in exit array 322. Each source can be imaged at an exit lenslet through a corresponding entrance lenslet in an efficient illumination system. Light of different colors entering one lenses can exit the same lenslet, as shown, or different (e.g. adjacent in X or Y) lenslets, depending on the angle and position and nature (segmented and flat) of the optical filters 304 and 305 and reflective optical element 308. After the optical system of FIG. 22, the light can be directed toward a light valve or through further optics as shown in the previous examples.

The optical system as discussed above has many advantages. For example, the optical system can be configured to be very compact, such as 100 cm or less, 50 cm or less, 20 cm or less, or 1 cm or less. When the light sources are solid-sate light sources, such as lasers and LEDs, the solid state light sources can be on the same substrate, such as a semiconductor substrate or packaging substrate. Moreover, the substrate can be integrated with other system components. When used in imaging systems that employ light valves, the light sources can be directly imaged onto the light valves because the optical length between the light sources and the light valve is substantially constant, which also helps to reduce the size of the optical system.

In examples wherein the dichroic filters are interference filters, the dichroic filters can be operated such that the corresponding light is incident substantially perpendicularly or close to perpendicular incidence (e.g. 10° or less, 5° or less, 2° or less). As a benefit, each dichroic filter may have fewer interference layers than dichroic filters used in larger incident angles. The dichroic filter for the green color can be a short/long pass filter especially when it is the second dichroic filter in the optical filter group (e.g. between the dichroic filters for the red and blue colors). The dichroic filters in the optical system as discussed above may have smaller sizes as compared to those used in existing optical system and/or imaging systems, which of course, reduces the cost of the system.

When a fly's eye lens array is used with the dichroic filters and integrators (e.g. integrators 176, 178, and 180 in FIG. 10 and FIG. 11, and integrators 200, 202, and 204 in FIG. 14), the fly's eye lens array can be closer to the collimation optics (e.g. collimation optics 112 in FIG. 15) than those in prior art.

It will be appreciated by those of skill in the art that a new and useful optical system comprising optical filters, including dichroic and polarization filters, for directing light from multiple light emitting devices has been described herein. In view of the many possible embodiments, however, it should be recognized that the embodiments described herein with respect to the drawing figures are meant to be illustrative only and should not be taken as limiting the scope of what is claimed. For example, a dichroic filter in any of the preceding examples could be replaced by another type of filter, such as a polarization filter. Those of skill in the art will recognize that the illustrated embodiments can be modified in arrangement and detail. Therefore, the devices and methods as described herein contemplate all such embodiments as may come within the scope of the following claims and equivalents thereof.

We claim:

1. A method, comprising:
   providing light from first and second light sources each producing light having a substantially separate spectrum;
   reflecting the light from the first light source by a dichroic filter that passes the light from the second light source; and
   reflecting the light from the second light source by a reflective surface, wherein the reflective surface has a non-zero angle to the dichroic filter, the angle between the reflective surface and the dichroic filter causing the reflected light from the first light source and the reflected light from the second light source to be combined along a common light path;
   wherein the first and second light sources are adjacent first and second LED light sources, laterally spaced in a linear array along a Cartesian Z-axis direction and producing light of respective different colors; and wherein light from the first LED light source is incident on the dichroic filter along a first optical axis aligned with a Cartesian coordinate X-axis, light from the second LED light source is incident on the reflective surface along a second optical axis offset by an angle $\delta_1$ from the X-axis, the dichroic filter is tilted about a Cartesian coordinate Y-axis by an angle $\Omega_0$ from the X-axis, and the reflective surface is tilted about the Y-axis by an angle $\Omega_1=\Omega_0-\delta_1/2$ from the X-axis, such that substantially all light from the first and second LED light sources is spatially and angularly coincident after being reflected off the dichroic filter and the reflective surface.

2. The method of claim 1, wherein the reflective surface is a reflective surface of another dichroic filter or a reflective surface of a mirror.

3. The method of claim 2, wherein the reflective surface comprises a series of segments.

4. The method of claim 1, further comprising:
providing light from a third LED light source adjacent to and laterally spaced along the Z-axis direction from the first and second LED light sources in the linear array and having a different color than the light from the first and second LED light sources; and
reflecting the light from the third LED light source by another dichroic filter that passes light from the first and second LED light sources;
wherein light from the third LED light source is incident on the another dichroic filter along a third optical axis offset by an angle $\delta_2$ from the X-axis, the another dichroic filter is tilted about the Y-axis by an angle $\Omega_2$ from the X-axis, and the another dichroic filter is tilted about the Y-axis by an angle $\Omega_2=\Omega_0+\delta_2/2$ from the X-axis, the angle between the reflective surface and the another dichroic filter causing the reflected light from the first and second light sources and the reflected light from the third light source to be combined along the common light path such that substantially all light from the first, second and third LED light sources is spatially and angularly coincident after being reflected off the dichroic filter, the reflective surface and the another dichroic filter.

5. The method of claim 4, wherein the light from the first, second and third LED light sources is directed to the dichroic filter, the reflective surface and the another dichroic filter through collimation optics.

6. The method of claim 5, wherein a uniform illumination field of the reflected light is generated by passing the reflected light combined along the common light path passes through a fly's eye lens array.

* * * * *